United States Patent [19]
Ohashi

[11] Patent Number: 5,999,515
[45] Date of Patent: Dec. 7, 1999

[54] METHOD AND APPARATUS FOR SHAPING PROCESSING IN WHICH DISCARD OF ATM CELL EFFECTIVELY PERFORMED

[75] Inventor: Satoshi Ohashi, Tokyo, Japan

[73] Assignee: NEC Corporation, Tokyo, Japan

[21] Appl. No.: 08/965,607

[22] Filed: Nov. 6, 1997

[30] Foreign Application Priority Data

Dec. 6, 1996 [JP] Japan ................................. 8-327266

[51] Int. Cl.$^6$ ............................... H04J 1/16; H04J 3/14
[52] U.S. Cl. ........................ 370/235; 370/229; 370/395
[58] Field of Search ................... 370/235, 229, 370/230, 232, 233, 234, 395, 397, 399, 409, 412, 413, 415, 417, 428, 231, 252, 253, 356, 379, 382, 383, 389, 392, 442, 444

[56] References Cited

U.S. PATENT DOCUMENTS

| | | | |
|---|---|---|---|
| 5,267,232 | 11/1993 | Katsube et al. | 370/230 |
| 5,271,005 | 12/1993 | Takase et al. | 370/399 |
| 5,274,641 | 12/1993 | Shobtake et al. | 370/392 |
| 5,280,475 | 1/1994 | Yanagi et al. | 370/399 |
| 5,373,504 | 12/1994 | Tanaka et al. | 370/253 |
| 5,453,981 | 9/1995 | Katsube et al. | 370/397 |
| 5,533,009 | 7/1996 | Chen | 370/232 |
| 5,689,499 | 11/1997 | Hullett et al. | 370/235 |
| 5,694,554 | 12/1997 | Kawabata et al. | 370/412 |
| 5,812,527 | 9/1998 | Kline et al. | 370/232 |

FOREIGN PATENT DOCUMENTS

| | | |
|---|---|---|
| 0 473 188 A1 | 3/1992 | European Pat. Off. . |
| 0 666 668 A1 | 8/1995 | European Pat. Off. . |
| 195 31 749 A1 | 3/1996 | Germany . |
| 3-286649 | 12/1991 | Japan . |
| 4-115643 | 4/1992 | Japan . |
| 4-286438 | 10/1992 | Japan . |
| 4-360340 | 12/1992 | Japan . |
| 5-160852 | 6/1993 | Japan . |
| 5-292116 | 11/1993 | Japan . |
| 6-216929 | 8/1994 | Japan . |
| 6-237497 | 8/1994 | Japan . |
| 7-135503 | 5/1995 | Japan . |
| 8-125668 | 5/1996 | Japan . |
| 8-195751 | 7/1996 | Japan . |
| 2316270 | 2/1998 | United Kingdom . |

OTHER PUBLICATIONS

Japanese Office Action dated Apr. 28, 1998 with English language translation of Japanese Examiner's comments.
Japanese Office Action dated Jan. 13, Hei 11 with English language translation of Japanese Examiner's comments.

Primary Examiner—Dang Ton
Assistant Examiner—Phirin Sam
Attorney, Agent, or Firm—Whitham, Curtis & Whitham

[57] ABSTRACT

In a shaping processing apparatus which receives ATM cells as reception ATM cells which contains normal ATM cells and tagging ATM cells, a scheduling unit calculates a transmission time of the reception ATM cell based on a transmission time of a previous ATM cell belonging to a same connection as the reception ATM cell and transmitted immediately before the reception ATM cell and a predetermined time interval. A cell identifying unit identifies a connection number and cell priority of the reception ATM cell. The normal ATM cell has a higher cell priority than the tagging ATM cell. A mapping unit maps the reception ATM cell into a managing table based on the transmission time of the reception ATM cell to store the connection number and cell priority of the reception ATM cell in a storage area of the managing table. The managing table is associated with transmission times. The mapping unit outputs an address corresponding to the storage area as the write address to a shaping processing buffer such that the reception ATM cell is stored in the shaping processing buffer.

20 Claims, 14 Drawing Sheets

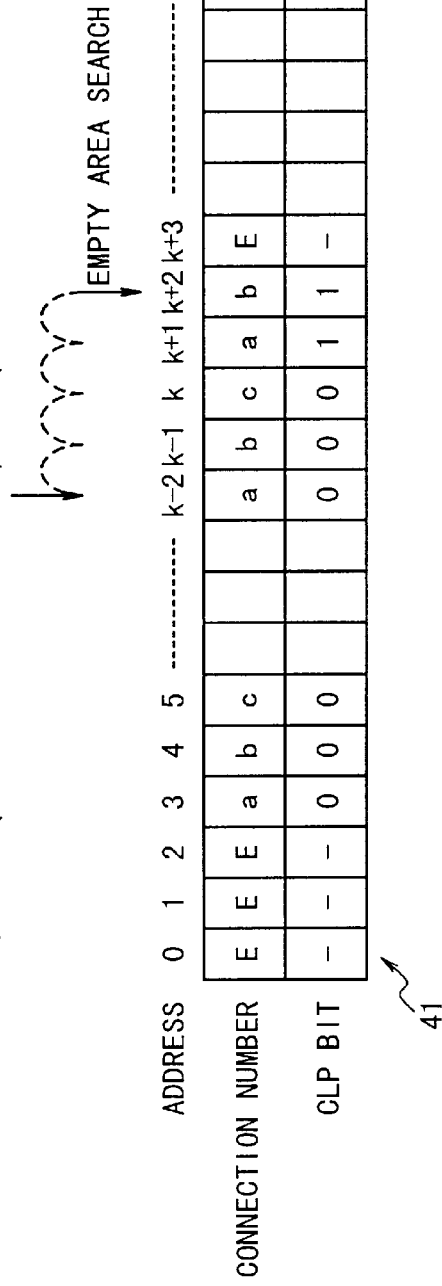

Fig. 9

| ADDRESS | 0 | 1 | 2 | 3 | 4 | 5 | ---- | k-2 | k-1 | k | k+1 | k+2 | k+3 | ---- | n-2 | n-1 | n |
|---|---|---|---|---|---|---|---|---|---|---|---|---|---|---|---|---|---|
| CONNECTION NUMBER | E | E | E | a | b | c | | a | b | c | a | a | E | | a | b | E |
| CLP BIT | - | - | - | 0 | 0 | 0 | | 0 | 0 | 0 | 1 | 0 | - | | 0 | 0 | - |

41

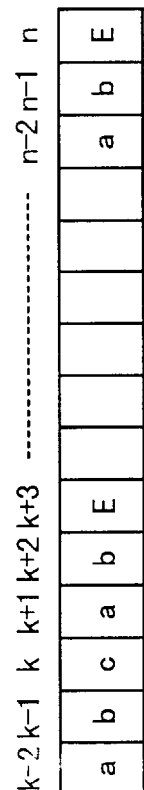

Fig. 14

RECEPTION CELL(CONNECTION NUMBER = a, CLP=0) SCHEDULING RESULT:k-2 (CONFLICT)
↓↓↓ EMPTY AREA SEARCH →

| ADDRESS | 0 | 1 | 2 | 3 | 4 | 5 | ---- | k-2 | k-1 | k | k+1 | k+2 | k+3 | ---- | n-2 | n-1 | n |
|---|---|---|---|---|---|---|---|---|---|---|---|---|---|---|---|---|---|
| CONNECTION NUMBER | E | E | E | a | b | c | | a | b | c | d | b | E | | a | b | E |
| CLP BIT | - | - | - | 0 | 0 | 0 | | 0 | 0 | 0 | 0 | 0 | - | | 0 | 0 | - |

Fig. 15

| ADDRESS | 0 | 1 | 2 | 3 | 4 | 5 | ---- | k-2 | k-1 | k | k+1 | k+2 | k+3 | ---- | n-2 | n-1 | n |
|---|---|---|---|---|---|---|---|---|---|---|---|---|---|---|---|---|---|
| CONNECTION NUMBER | E | E | E | a | b | c | | a | b | c | d | b | a | | a | b | E |
| CLP BIT | - | - | - | 0 | 0 | 0 | | 0 | 0 | 0 | 0 | 0 | 0 | | 0 | 0 | - |

METHOD AND APPARATUS FOR SHAPING PROCESSING IN WHICH DISCARD OF ATM CELL EFFECTIVELY PERFORMED

BACKGROUND OF THE INVENTION

1. Field of the Invention

The present invention relates to an asynchronous transfer mode (ATM) self-flow control system, and more particularly to a shaping function which is used for traffic control in a user terminal transmission end, an ATM network transmission and reception ends or an ATM network.

2. Description of the Related Art

As well-known, all data are handled as ATM cells with 53-byte fixed length in an ATM system. A control data header is 5 bytes of the 53 bytes and an information field for a user data (called a payload) is 48 bytes. In this way, in the ATM system, a data sequence with this fixed length (a packet) is used as a unit of multiplexing and exchanging. In the header are written a data VCI (virtual channel identifier) for identifying a connection to which the ATM cell belongs, a data VPI (virtual pass identifier), a data CLP (cell priority identifier) for indicating whether or not discard of the ATM cell is permissible when congestion is generated, a data PT (cell class identifier) for identifying network control information, and a data for functions such as header error detection/control (HEC).

Here, the connection indicates a route used to transmit the ATM cell between the users. The ATM cells having different identifiers are prepared for communication between different users. The identifier is called a connection number. The connection number contains the above data VCI and data VPI. Also, the CLP bit which is defined in the header is the bit which indicates a discard priority of the ATM cell, as described above. The data CLP=1 indicates that the ATM cell has a high discard priority, and the data CLP=0 indicates that the ATM cell has a low discard priority. In this specification, the ATM cell of CLP=0 is referred to as a normal ATM cell or a usual ATM cell, and the ATM cell of CLP=1 is referred to as a tagging ATM cell. The tagging ATM cell has a discard priority higher than the normal ATM cell and is always possible to be discarded. That is, the tagging ATM cell may be transmitted when the transmission route is empty, if it does not affect to other ATM cells.

By the way, since such ATM cells are randomly transmitted from a transmission side, the ATM cells are received as the reception ATM cells which are temporally dispersed on the reception side, as shown in FIG. 14A. Here, in FIGS. 14A, A, B, C, D and E indicate the ATM cells. As shown in FIG. 14A, because each of the ATM cells has different transmission rates, there is a case that a large time interval is between the adjacent reception ATM cells as in the ATM cells B and C. Also, there is a case that small time intervals are between the adjacent reception ATM cells as in the ATM cells C, D and E. If the time interval between the adjacent reception ATM cells is so small that a lump of ATM cells is formed such as the ATM cells C, D and E, the transmission rates of the ATM cells sometimes become higher than a predetermined transmission rate. Such a lump of ATM cells is called a burst ATM cell group and it is said that the burst degree is high as the time interval between the ATM cells becomes smaller.

In order to reduce the burst degree, an operation is performed to separate a reception ATM cell from another reception ATM cell immediately before the reception ATM cell (Hereinafter, to be merely referred to as a previous ATM cell) by a predetermined time interval or more. For this purpose, a delay buffer is used to delay a reception ATM cell by the predetermined time interval. The function to correct the transmission rate of the ATM cell in this way, in other words, the function to adjust an ATM cell time interval is called "traffic shaping" or simply "shaping" in this technical field. That is, in the shaping, as shown in FIG. 14B, the transmission rates of the reception ATM cells are corrected to have a predetermined value in accordance with a preset parameter (requested transmission rate). Therefore, because the above delay buffer is used for the shaping, the delay buffer is also called a shaping processing buffer.

FIG. 1 shows the structure of a conventional shaping processing apparatus. The conventional shaping processing apparatus is composed of a shaping processing buffer 10, an ATM cell identifying section 20', a scheduling section 30 and a mapping section 40'.

The shaping processing buffer 10 can receive read/write addresses $A'_{W/R}$ outputted from the mapping section 40' to be described later, randomly write the reception ATM cells Cr in accordance with the read/write address $A'_{W/R}$, and sequentially read the written ATM cells as transmission ATM cells Ct.

The scheduling section 30 calculates a time interval between a previous ATM cell of the same connection and a current ATM cell based on shaping algorithm so that the reception ATM cell Cr can be transmitted in an ideal ATM cell time interval. The scheduling section 30 determines a necessary delay quantity based on the calculated time interval, and outputs a storage address As of the reception ATM cell indicating an ideal transmission time to the mapping section 40'.

The mapping section 40' performs the mapping of the reception ATM cell Cr as follows. That is, the mapping section 40' detects whether or not the area corresponding to the storage address is empty, based on the reception ATM cell storage address As supplied from the scheduling section 30. When another ATM cell is already mapped into the storage address area so that a conflict is generated, search processing is executed for an empty storage address area which is the nearest to the storage address area for the address in a direction behind the storage address area to determine a new storage address area for the reception ATM cell Cr in the shaping processing buffer 10. The mapping section 40' stores related information such as the connection number of the reception ATM cell Cr and the data CLP in the empty storage address area. Also, the mapping section 40' outputs the reception ATM cell write address to the shaping processing buffer 10.

The ATM cell identifying section 20' outputs the ATM cell identifying result $R'_{ci}$ in accordance with the connection number. The mapping section 40' receives this ATM cell identifying result $R'_{ci}$. As shown in FIG. 2, the mapping section 40' is composed of a transmission time managing memory 41' having (n+1) addresses, for managing the empty address areas and the connection numbers when the mapping is performed, and an address managing section 42' for the transmission time managing memory 41'.

Next, the operation of the conventional shaping processing apparatus shown in FIG. 1 will be described.

Here, it is assumed that the ATM cell stream in which normal ATM cells and a lot of tagging ATM cells are mixed in a same band to have a relatively high burst traffic characteristic. In this case, the ATM cell identifying section 20' extracts the connection number of a reception ATM cell Cr from the header of the reception ATM cell Cr and transfers to the mapping section 40'. Also, at the same time, the scheduling section 30 determines the transmission time of the reception ATM cell Cr as follows. That is, the scheduling section 30 finds an ideal or theoretical transmission time of the reception ATM cell Cr from shaping algorithm calculation based on the arrival time of the reception ATM cell Cr, the transmission time of the previous ATM cell having the same connection number, and the transmission time interval of the transmission ATM cell which is previously set for the connection number. Then, the scheduling section 30 transmits the determined ideal transmission time to the mapping section 40'.

When receiving the above various types of information, the mapping section 40' refers to the transmission time managing memory 41' for managing the address information. Thus, the mapping section 40' checks whether the storage address area corresponding to the ideal transmission time of the reception ATM cell Cr is empty. The transmission time managing memory 41' manages a storage area corresponding to the ideal transmission time of the reception ATM cell Cr. When it is determined that the storage address area corresponding to the ideal transmission time of the reception ATM cell Cr is empty, the mapping section 40' outputs the connection number of the reception ATM cell Cr and this address information to the address area as a write address of the shaping processing memory 10.

Also, various conventional examples which relate to the present invention are proposed. For example, In Japanese Laid Open Patent Disclosure (JP-A-Heisei 6-216929: hereinafter, to be referred to as a first conventional example), an "ATM switch" is disclosed in which ATM cells which are centered to a specific input line are processed using memories which are even arranged for input lines. In the first conventional example, the ATM cell conflict control state of the whole ATM switch is estimated. In a congestion state, the number of ATM cells to be transmitted is suppressed, and in the empty state, a lot of ATM cells are transmitted. Alternatively, the arrival time of the ATM cell is recorded in the ATM cell, and the arrival time of the ATM cell is considered based on the recorded arrival time such that an ATM cell having a long waiting time is transmitted. In order to reduce the congestion state of the ATM cells, it is necessary that the arrival time and the transmission time of the ATM cell are managed for a conflict control. However, the object of the first conventional example is to attempt to improve the non-equality of ATM cell traffic by the buffer management of the ATM switch. Therefore, the first conventional example has no relation with the shaping function according to the present invention.

Also, in Japanese Laid Open Patent Disclosure (JP-A-Heisei 4-115643: to be referred to, hereinafter, as a second conventional example) corresponding to U.S. Pat. No. 5,267,232, a "method of controlling a data transmission in ATM network" is disclosed. In the second conventional example, a network control is achieved in a simple mode, when a plurality of discard priorities exist in one virtual channel. The method is composed of a step of separately declaring traffic characteristic of whether there are only discard non-permitted ATM cells or whether there are mixed discard permitted ATM cells and discard non-permitted ATM cells, and a step of estimating an ATM cell discard ratio based on the declared traffic characteristic to execute connection accept desk control (CAC) in the network. The ATM cell discard ratio is separated based on whether there are only discard non-permitted ATM cells or whether there are mixed discard permitted ATM cells and discard non-permitted ATM cells in the multiplexed virtual channel. The ATM cell discard ratio is guaranteed by the network based on the estimated ATM cell discard ratio.

It should be noted that the discard permitted ATM cell in the second conventional example and the discard non-permitted ATM cell are equivalent to the tagging ATM cell and the normal ATM cell or the usual ATM cell of the present invention, respectively. The second conventional example discloses the technique to guarantee an ATM cell discard ratio for every virtual channel. Therefore, the second conventional example has no relation with the shaping function according to the present invention, like the above first conventional example.

In the above-mentioned conventional shaping processing apparatus, in the memory conflict control system which has a general shaping function, the shaping processing is performed without being conscious of the tagging ATM cell. That is, all the reception ATM cells are handled equally as the normal ATM cell without identifying the tagging ATM cell.

In a case where the above conventional examples are used, the burst degree is estimated by a network administrator, and the ATM cell delay buffer is designed in such a manner that the shaping processing can be sufficiently performed. However, when a lot of tagging ATM cells are contained in the ATM cells in the same band, there is a case that the burst is generated so that the ATM cells are received over a permission value of the ATM cell delay buffer. In this case, therefore, there is a problem in that the reception ATM cells over this permission value has been consequently discarded.

In accordance with, in order to solve this, it is necessary to increase the permission value of the ATM cell delay buffer which is necessary for the process shaping. However, it is obscure that the problem passes away if the buffer has what quantity. Also, if the buffer quantity is increased, a new problem occurs in which the hardware scale increases.

SUMMARY OF THE INVENTION

Therefore, the present invention is made in the view of the above-mentioned circumstances. An object of the present invention is to provide a method and apparatus for shaping processing, in which increase discard quality of the reception ATM cells which contains tagging ATM cells without increasing a permission value of a shaping processing delay buffer.

In order to achieve an aspect of the present invention, a shaping processing apparatus which receives ATM cells as reception ATM cells which contains normal ATM cells and tagging ATM cells, includes a shaping processing buffer for writing the reception ATM cell in accordance with a write address, and for reading the written ATM cell in response to a read address as a transmission cell, a scheduling unit for calculating a transmission time of the reception ATM cell based on a transmission time of a previous ATM cell belonging to a same connection as the reception ATM cell and transmitted immediately before the reception ATM cell and a predetermined time interval, a cell identifying unit for identifying a connection number and cell priority of the reception ATM cell, the normal ATM cell having a higher cell priority than the tagging ATM cell, and a mapping unit for mapping the reception ATM cell into a managing table based on the transmission time of the reception ATM cell to store the connection number and cell priority of the reception ATM cell in a storage area of the managing table, the managing table being associated with transmission times, for outputting an address corresponding to the storage area as the write address to the shaping processing buffer, and for generating read addresses based on the managing table to output to the shaping processing buffer.

In this case, the mapping unit searches the managing table for the storage address to which the mapping is possible. The mapping unit determines that it is possible to map the reception ATM cell into the storage address of the managing table when it is determined that the storage address of the managing table is empty.

Also, the mapping unit determines that it is possible to map the reception ATM cell into the storage address of the managing table when it is determined that another ATM cell is already mapped into the storage address of the managing table and when it is determined from a connection number and cell priority of the other ATM cell that the other ATM cell stored in the storage address is a tagging ATM cell having a same connection number as that of the reception ATM cell.

In addition, the mapping unit determines that it is possible to map the reception ATM cell into the storage address of the managing table when it is determined that another ATM cell is already mapped into the storage address of the managing table and when it is determined from a cell priority of the other ATM cell that the other ATM cell stored in the storage address is a tagging ATM cell.

Alternatively, the cell identifying may issue a discard notice to the mapping unit when determining from the cell priority of the reception ATM cell that the reception ATM cell is a tagging ATM cell. In this case, the mapping unit stops the mapping of the reception ATM cell in response to the discard notice.

In order to achieve another aspect of the present invention, a method of performing shaping processing, includes the steps of:

(a) receiving an ATM cell as a reception ATM cell;
(b) extracting a connection number and a cell priority from the reception ATM cell;
(c) determining a transmission time of the reception ATM cell based on a transmission time of an ATM cell having a same connection number and transmitted immediately before the reception ATM cell, a predetermined time interval, and an arrival time of the reception ATM;
(d) generating a storage address of a transmission time managing memory for the reception ATM cell as a current address;
(e) referring to the transmission time managing memory to store the extracted connection number and extracted cell priority of the reception ATM cell in the current address of the transmission time managing memory, when the current address is empty;
(f) outputting the current address as a write address; and
(g) storing the reception ATM cell in a shaping processing buffer.

Here, the referring step includes:

(h) performing first determination of whether the current address is empty.

In this case, the step of performing first determination may include:

(i) when it is determined that the current address is not empty, performing second determination of whether the cell priority stored in the current address is lower than the reception ATM cell; and
(j) overwriting the extracted connection number and extracted cell priority of the reception ATM cell in the current address of the transmission time managing memory, when it is determined that the cell priority stored in the current address is lower than the reception ATM cell. Also, the method may further include the steps of:

(k) when it is determined that the cell priority stored in the storage address is not lower than the reception ATM cell, setting a storage address of the transmission time managing memory subsequent to the current address in transmission time to a new current address; and
(l) executing the steps (h) through (k) based on the new current address until the extracted connection number and extracted cell priority of the reception ATM cell are overwritten or stored in the current address of the transmission time managing memory.

Alternatively, the step of performing first determination may include:

(m) when it is determined that the current address is not empty, performing second determination of whether the cell priority stored in the current address is lower than the reception ATM cell and whether the connection number stored in the current address is same as that of the reception ATM cell; and
(n) overwriting the extracted connection number and extracted cell priority of the reception ATM cell in the current address of the transmission time managing memory, when it is determined that the cell priority stored in the current address is lower than the reception ATM cell and that the connection number stored in the current address is same as that of the reception ATM cell. Also, the method may further include the steps of:
(o) when it is determined that the cell priority stored in the storage address is not lower than the reception ATM cell, or that the connection number stored in the current address is not same as that of the reception ATM cell, setting a storage address of the transmission time managing memory subsequent to the current address in transmission time to a new current address; and
(p) executing the steps (h) and (m) through (o) based on the new current address until the extracted connection number and extracted cell priority of the reception ATM cell are overwritten or stored in the current address of the transmission time managing memory.

Further, the method may include the steps of:

determining whether the cell priority of the reception ATM cell is lower than a predetermined value; and
discarding the reception ATM cell when it is determined that the cell priority of the reception ATM cell is lower than the predetermined value.

In order to achieve still another aspect of the present invention, a shaping processing apparatus, includes an extracting unit for receiving an ATM cell as a reception ATM cell, and for extracting a connection number and a cell priority from the reception ATM cell, a scheduling unit for receiving an ATM cell as a reception ATM cell, for determining a transmission time of the reception ATM cell based on a transmission time of an ATM cell having a same connection number and transmitted immediately before the reception ATM cell, a predetermined time interval, and an arrival time of the reception ATM, and for generating a storage address of a transmission time managing memory for the reception ATM cell as a current address, a shaping processing buffer for storing the reception ATM cell in accordance with a write address, and a mapping unit including the transmission time managing memory, for referring to the transmission time managing memory to store the extracted connection number and extracted cell priority of the reception ATM cell in the current address of the transmission time managing memory, when the current address is empty, and for outputting the current address as the write address to the shaping processing buffer.

BRIEF DESCRIPTION OF THE DRAWINGS

FIG. 7 is a diagram illustrating an example of the content of a transmission time managing memory used in the mapping section of FIG. 4;

FIG. 8 is a diagram illustrating a search operation for an empty storage area in the shaping processing method shown in FIG. 6 when the reception ATM cells conflict;

FIG. 9 is a diagram illustrating the search result of the empty storage area in the shaping processing method shown in FIG. 6;

FIG. 11 is a diagram illustrating the search operation of an empty storage area in the shaping processing method shown in FIG. 10 when the reception ATM cells conflict;

FIG. 12 is a diagram illustrating the search result of the empty storage area in the shaping processing method shown in FIG. 10;

FIG. 14 is a diagram illustrating the search operation of an empty storage area in the shaping processing method shown in FIG. 13 when the reception ATM cells conflict;

FIG. 15 is a diagram illustrating the search result of the empty storage area in the shaping processing method shown in FIG. 13;

DESCRIPTION OF THE PREFERRED EMBODIMENTS

The shaping processing apparatus of the present invention will be described below in detail with reference to the drawings.

Figure 5:
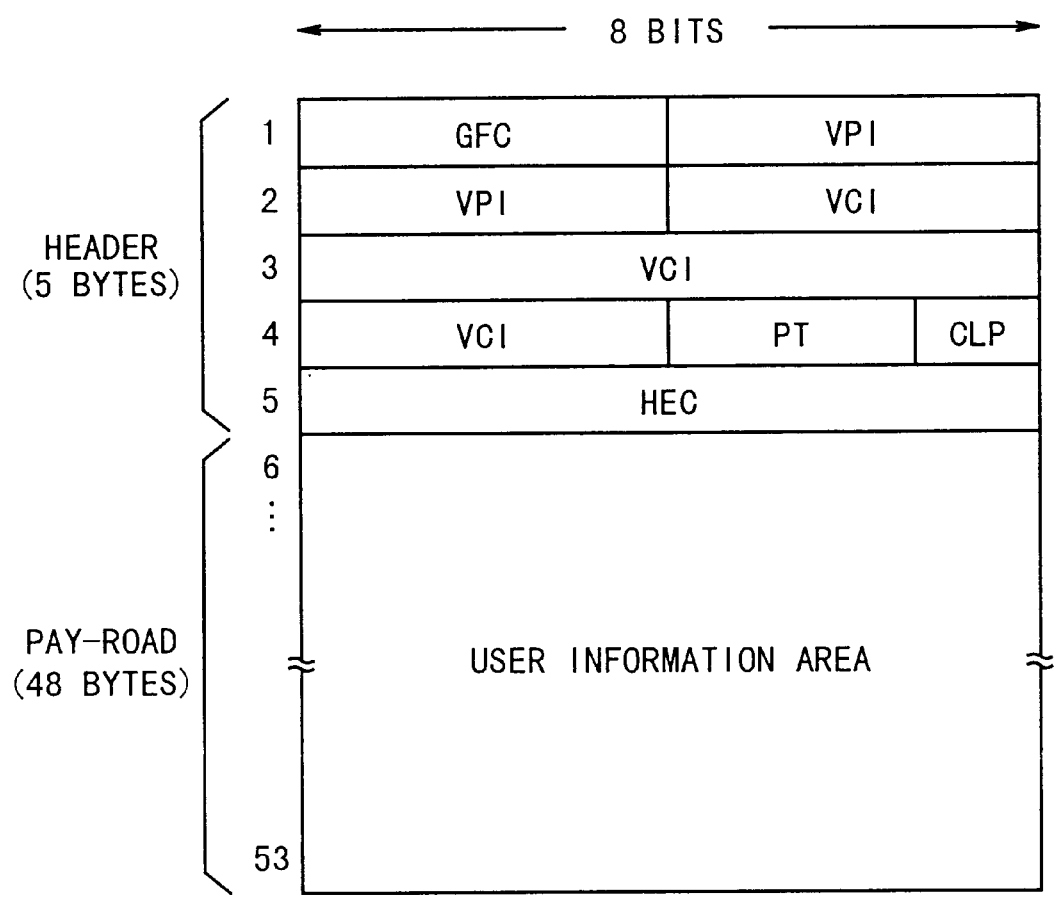
FIG. 5 is a diagram illustrating the format of an ATM cell.

The format of the ATM cell will be first described with reference to FIG. 5. As shown in FIG. 5, an ATM cell is composed of a header field of 5 bytes and a payload field of 48 bytes, i.e., a data of 53 bytes in total.

Also, as shown in FIG. 5, the header field is composed of a general flow control (GFC) field of 4 bits, a virtual path identifier (VPI) field of 8 bits, a virtual channel identifier (VCI) field of 16 bits, a payload-type (PT) field of 3 bits, an ATM cell loss priority (CLP) field of 1 bit, and a header error detection/correction (HEC) field of 8 bits. The GFC field is used for the GFC protocol. The VPI field is a number to identify each virtual path (VP). The VCI field is a number to identify each virtual channel (VC). The VPI field and the VCI field indicate the identifier of the ATM cell, i.e., a connection number of the ATM cell. The PT field is used to identify whether the content contained in the payload-type field is such as a user data. The CLP field indicates the ATM cell discard priority, as described above. The bit CLP=1 indicate that the ATM cell has a high discard priority and the bit CLP=0 indicates the ATM cell has a low discard priority. The HEC field is used for the error detection/correction of the header field and ATM cell synchronization.

Figure 1:
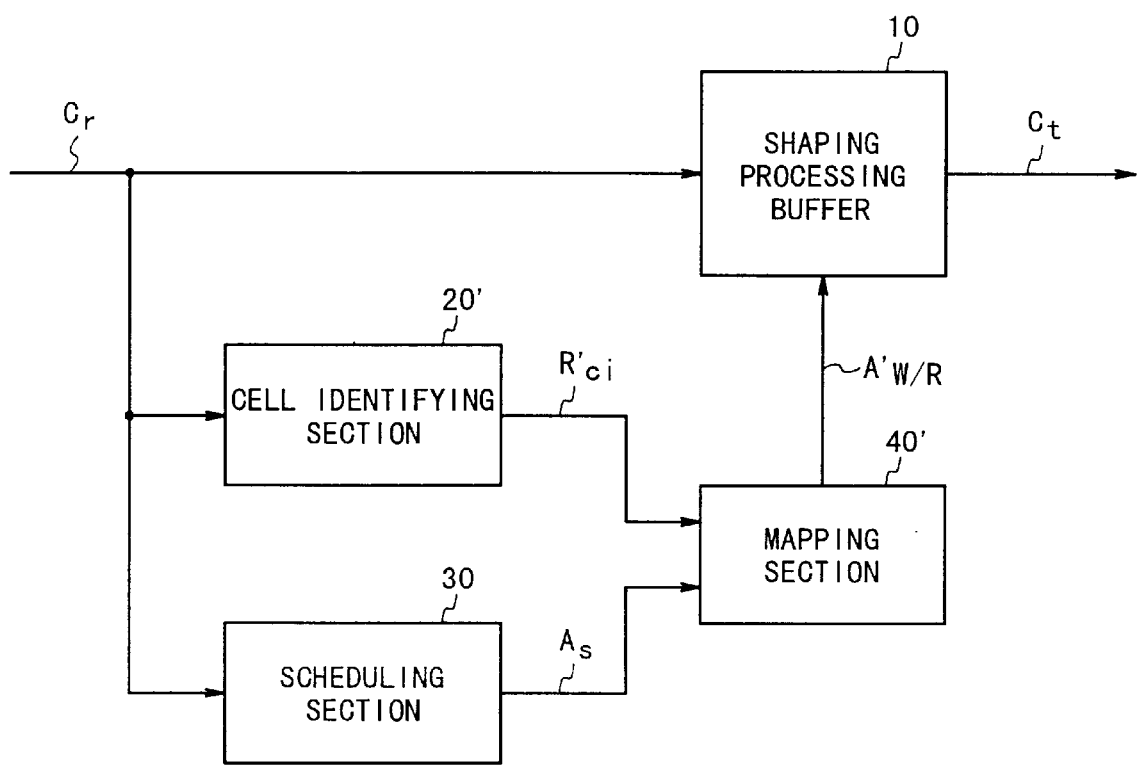
FIG. 1 is a block diagram illustrating the structure of a conventional shaping processing apparatus.
Figure 2:
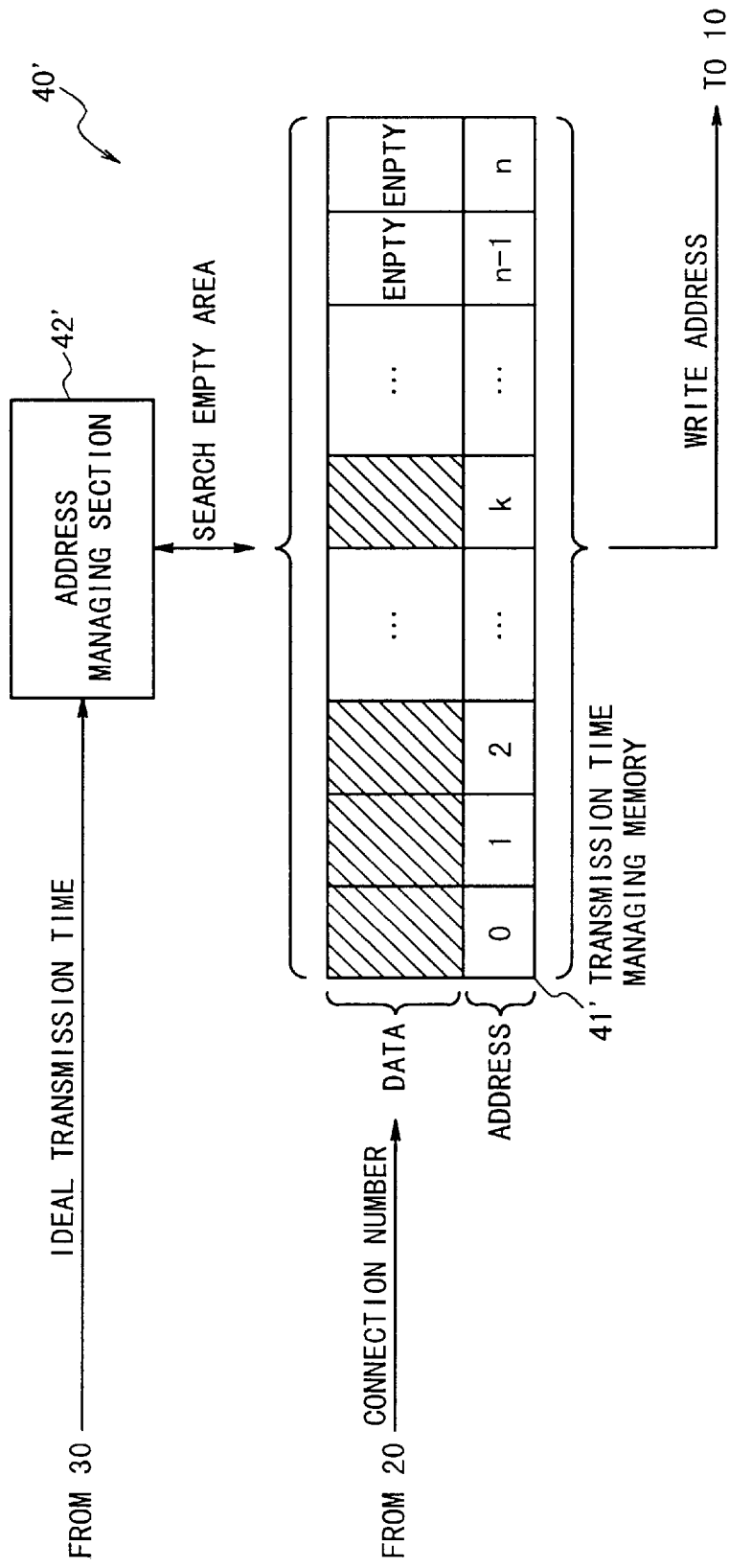
FIG. 2 is a block diagram illustrating the structure of a mapping section used in the conventional shaping processing apparatus shown in FIG. 1.
Figure 3:
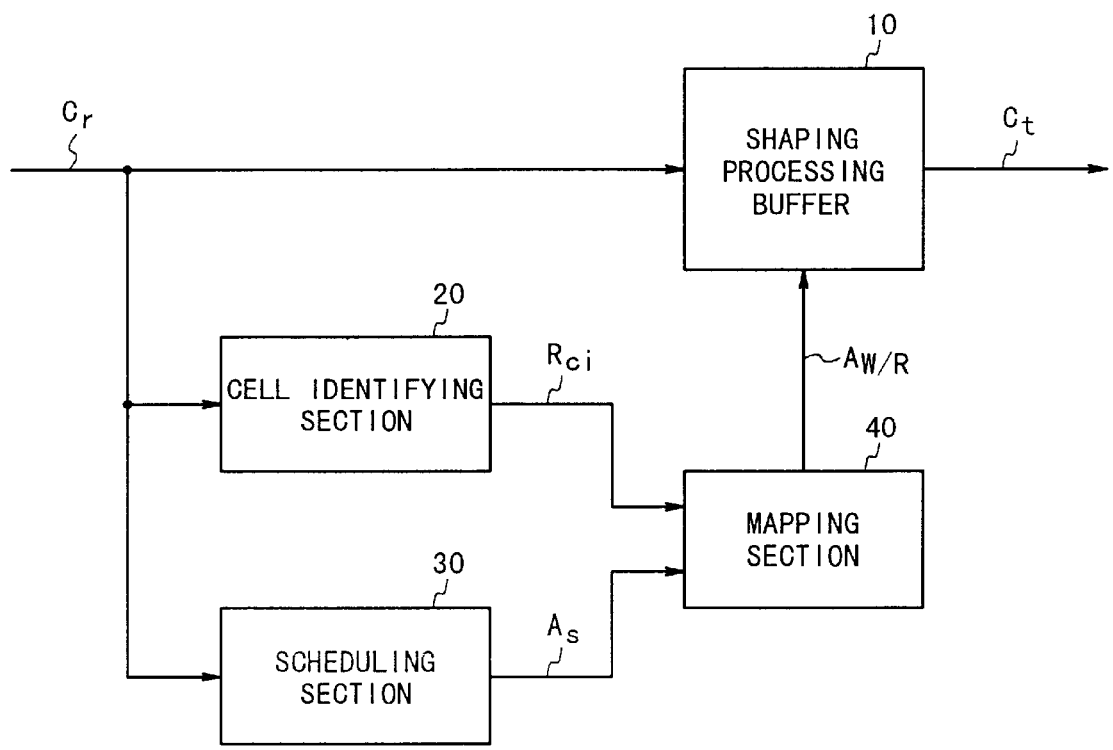
FIG. 3 is a block diagram illustrating the structure of a shaping processing apparatus according to a first embodiment of the present invention.

FIG. 3 shows the structure of the shaping processing apparatus according to the first embodiment of the present invention. Referring to FIG. 3, the shaping processing apparatus in the first embodiment is composed of a shaping processing buffer 10, an ATM cell identifying section 20, a scheduling section 30 and a mapping section 40.

The shaping processing buffer 10 can receive a read/write address $A_{W/R}$ from the mapping section 40 to be mentioned later. Also, the shaping processing buffer writes a reception ATM cell Cr randomly in accordance with the write address $A_W$, and sequentially reads the written ATM cell as transmission ATM cell Ct in accordance with the read address $A_R$.

The scheduling section 30 calculates a time interval between a previous ATM cell and a current ATM cell in a same connection based on the shaping algorithm calculation such that the reception ATM cell Cr is transmitted in an ideal ATM cell time interval. The scheduling section 30 determines a necessary delay quantity based on the calculated time interval, and outputs a storage address As for the reception ATM cell which indicates an ideal transmission time to the mapping section 40.

In the present invention, the ATM cell identifying section 20 identifies a tagging ATM cell in addition to the identification of the connection number. The ATM cell identifying section 20 outputs the ATM cell identifying result $R_{ci}$ to the mapping section 40.

Figure 4:
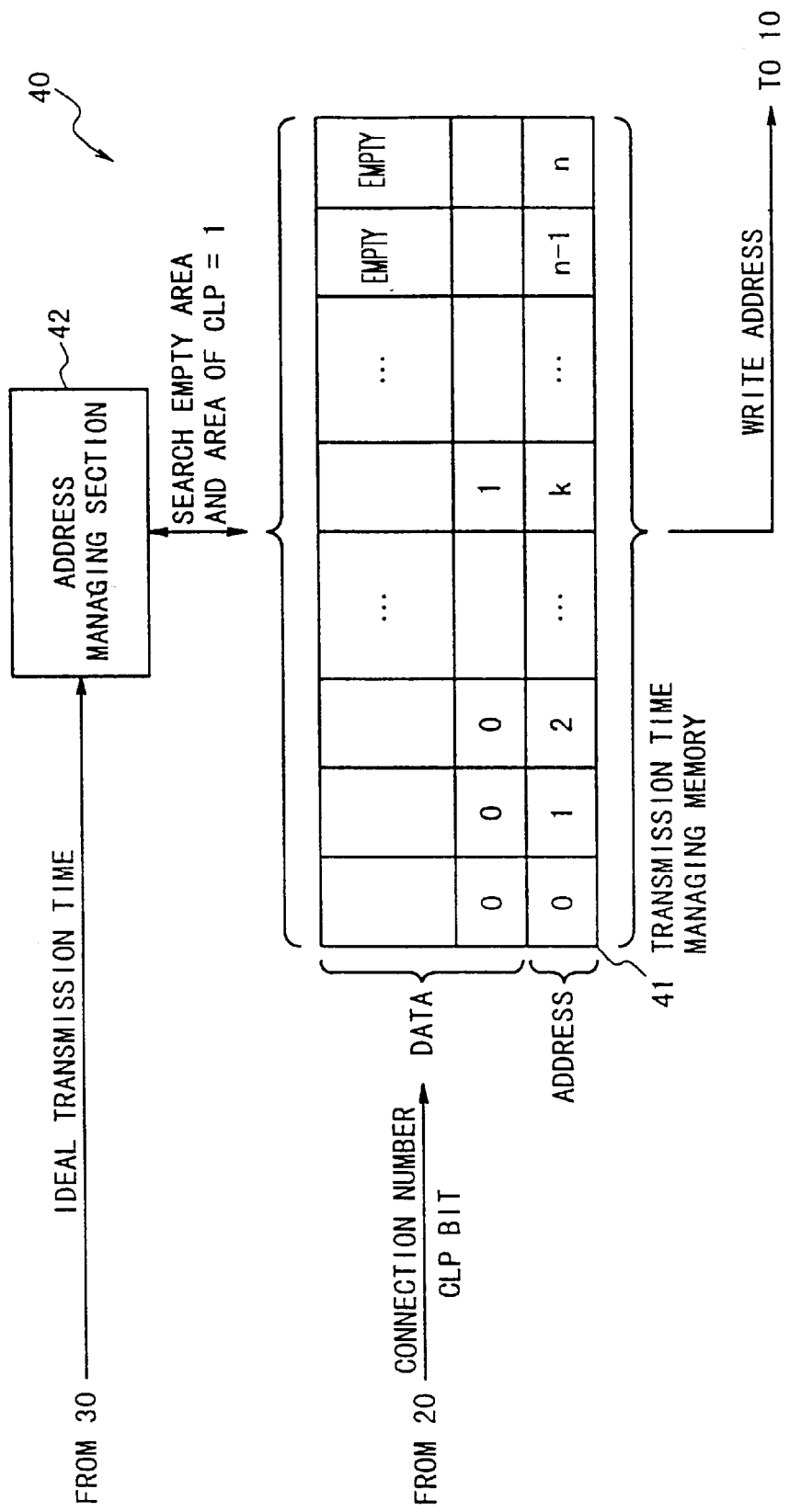
FIG. 4 is a block diagram illustrating the structure of a mapping section used in the shaping processing apparatus according to a first embodiment of the present invention.

As shown in FIG. 4, the mapping section 40 is composed of a transmission time managing memory 41 having (n+1) addresses which can manage the connection number and the CLP bit of the reception ATM cell and an address managing section 42 for managing the transmission time managing memory 41. The mapping section 40 performs the mapping of the reception ATM cell Cr as follows. That is, the mapping section 40 receives the reception ATM cell storage address As supplied from the scheduling section 30. The address managing section 42 determines whether an area of the transmission time managing memory 41 corresponding to the reception ATM cell storage address As is empty. When another ATM cell is already mapped into the area of the transmission time managing memory 41 corresponding to the reception ATM cell storage address As to generate a conflict with the current ATM cell, the mapping section 40 executes search processing. In the search processing, the mapping section 40 searches the transmission time managing memory 41 for the nearest empty area to the above reception ATM cell storage address As behind the address As, i.e., in a time delayed from the timing corresponding to the reception ATM cell storage address As. Thus, a storage area of the reception ATM cell Cr in the shaping processing buffer 10 is determined. Then, the mapping section 40 stores in the determined area of the transmission time managing memory 41 relation information such as a connection number and CLP bit of the reception ATM cell Cr which are supplied from the cell identifying section 20. Also, the mapping section 40 outputs the storage area address as a reception ATM cell write address $A_W$ to the shaping processing buffer 10.

Next, the operation of the shaping processing apparatus shown in FIG. 3 will be described.

Here, it is assumed that an ATM cell stream is received which has relative high burst traffic characteristic and in which there are mixed normal ATM cells and a lot of tagging ATM cells in the same band. In this case, the ATM cell identifying section 20 extracts the connection number and CLP bit from the header section of the reception ATM cell Cr and transmits them to the mapping section 40. Also, at the same time, the scheduling section 30 determines the transmission time of the reception ATM cell Cr as follows. That is, the scheduling section 30 performs shaping algorithm calculation based on the arrival time of the reception ATM cell Cr, the transmission time of a reception ATM cell Cr as a previous reception ATM cell which has been previously received in a same connection number, and the ATM cell transmission time interval which is previously set to this connection number to determines an ideal or theoretical transmission time of the reception ATM cell Cr. Then, the scheduling section 30 transmits the determined ideal or theoretical transmission time as the reception ATM cell storage address As to the mapping section 40.

The transmission time managing memory 41 has an address which indicates a storage area the reception ATM cell in the shaping processing buffer 10. Therefore, when receiving the connection number and the CLP bit from the cell identifying section 20 and the reception ATM cell storage address As from the scheduling section 30, the address managing section 42 of the mapping section 40 refers to the transmission time managing memory 41. Thus, whether an area of the transmission time managing memory 41 corresponding to the reception ATM cell storage address As is empty is determined.

Here, when the storage address of the transmission time managing memory 41 is determined to be empty, the mapping section 40 writes the connection number and CLP bit of the reception ATM cell Cr in the storage address of the transmission time managing memory 41. Since the storage address has an address data, which is outputted to the shaping processing memory 10 as write address.

However, when a conflict is generated because an existing ATM cell is in the storage address, the mapping section 40 performs overwrite only when the existing ATM cell is a tagging ATM cell and has another connection number which is different from that of the reception ATM cell Cr. That is, the existing ATM cell is discarded and the reception ATM cell Cr is mapped to the storage area. Through the above operations, the normal reception ATM cell is overwritten into the storage area which is occupied by the existing tagging ATM cell in case of the conflict state as described above. Thus, the storage area which the tagging ATM cell occupies can be effectively used. In this manner, the buffer area of the shaping processing memory 10 is sufficient to have an enough capacity for the normal ATM cells which are used. The discard quality of the reception ATM cell Cr can be accomplished without increase the buffer area of the shaping processing memory 10.

Next, the shaping processing method according to the first embodiment of the present invention will be described with reference to FIGS. 6 through 9. It supposes that the shaping processing apparatus has the basic shaping function as described above at least. Also, it supposes that an ATM cell stream is received in which there are normal ATM cells and a lot of tagging ATM cells in the same band so as to have relatively high burst traffic characteristic.

In this case, first, the ATM cell identifying section 20 extracts the connection number, i.e., the data VPI and data VCI of this reception ATM cell and the CLP bit from the header field (FIG. 3) of the ATM cell. The ATM cell is a normal ATM cell in case of CLP=0 and a tagging ATM cell in case of CLP=1. The mapping section 40 receives these data and determines a theoretical transmission time to set a transmission time address As, which is outputted from the scheduling section 30 to the mapping section 40 (step S1). In this case, the transmission time address As is an address which is obtained by associating the theoretical transmission time which determined by the scheduling section 30 with an address of the transmission time managing memory 41.

The mapping section 40 determines whether the storage area corresponding to the transmission time address As of the reception ATM cell is empty (step S2). In this case, if the storage area for the reception ATM cell As is assumed to be (K+3), the storage address (K+3) is empty, as shown in FIG. 7. In this case, the connection number and the CLP bit of the reception ATM cell are stored in the transmission time managing memory 41 in the storage address (K+3). Also, this storage address is outputted as a write address to the shaping processing buffer 10 (step S3).

However, when the storage address As is supposed to be (K−2), an existing ATM cell is stored in the storage area, as shown in FIG. 8. In this case, a conflict is generated in the storage address (k−2) (No of step S2). FIG. 8 shows a case where the connection number of the reception ATM cell is a in case of CLP=0 and the scheduling result indicates the generation of the conflict in the address As=(k−2). In this case, the mapping section 40 determines whether or not the same connection number as that of the reception ATM cell Cr is stored in the storage address A=(k−2) the transmission time managing memory 41 (step S4). In this case, because the connection number a which is the same as the reception ATM cell is stored in the transmission time managing memory address As=(k−2), the mapping section 40 increments the transmission time managing memory address As by 1 (step S5). Then, the control returns to step S2.

An existing ATM cell is stored in the transmission time managing memory address As=(k−1) (No of step S2). Because the connection number b which is different from that of the reception ATM cell is stored in transmission time managing memory address As=(k−1) (No of step S4), the mapping section 40 determines whether or not the CLP bit stored in the transmission time managing memory address As=(k−1) is "1" (step S6). In this case, because the CLP bit is "0", the mapping section 40 increments the transmission time managing memory address As by 1 once again (step S5). Then, the control returns to step S2.

This processing is repeated. Only when the conflicting ATM cell is a tagging ATM cell and has another connection number which is different from that of the reception ATM cell (Yes of step S6), the mapping section 40 performs overwrite. That is, the existing ATM cell is discarded and the reception ATM cell is mapped into the transmission time managing memory address (K+2), as shown in FIG. 9 (step S3).

Figure 6:
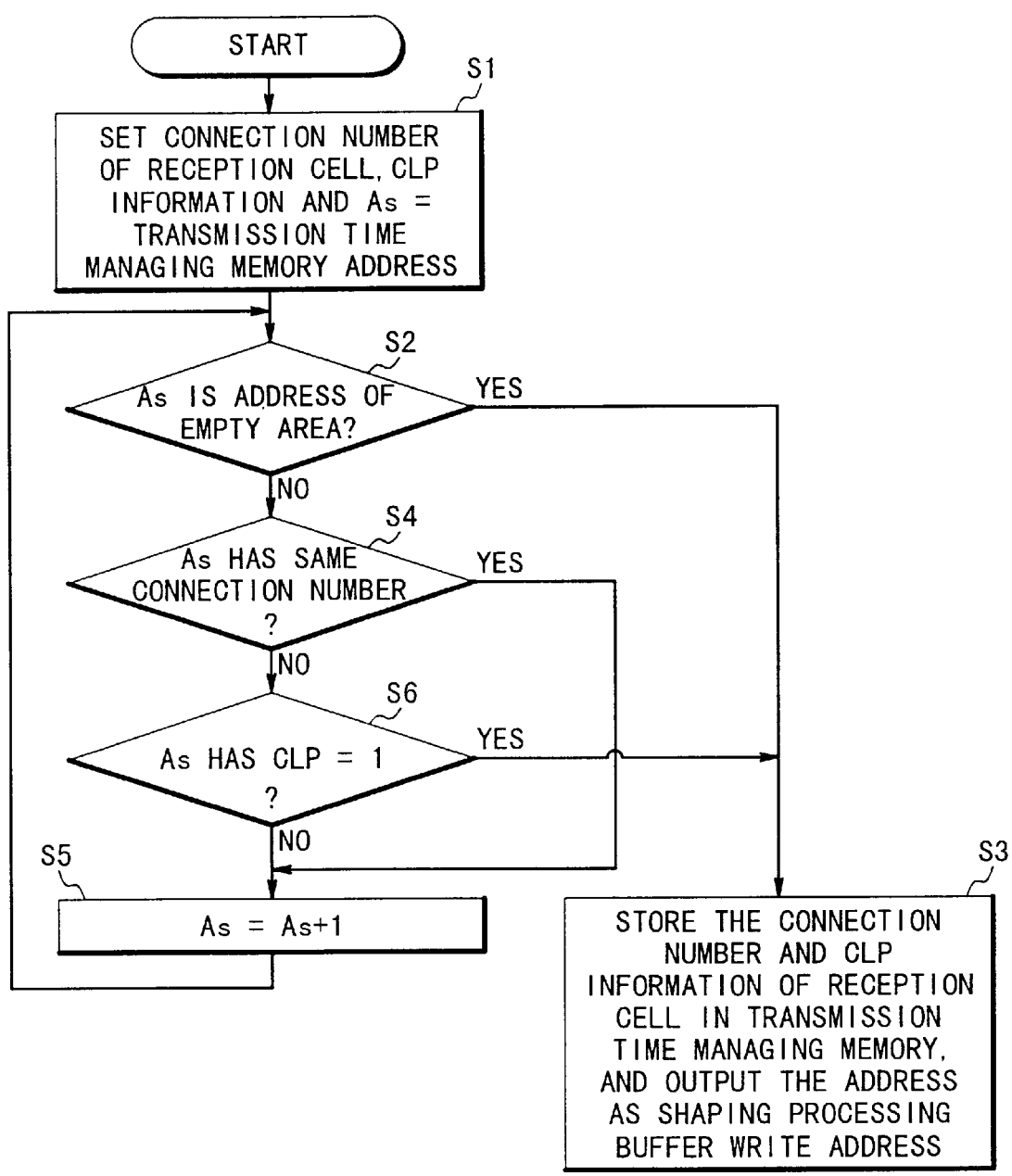
FIG. 6 is a flow chart to explain the operation of the shaping processing apparatus according to the first embodiment of the present invention.
Figure 10:
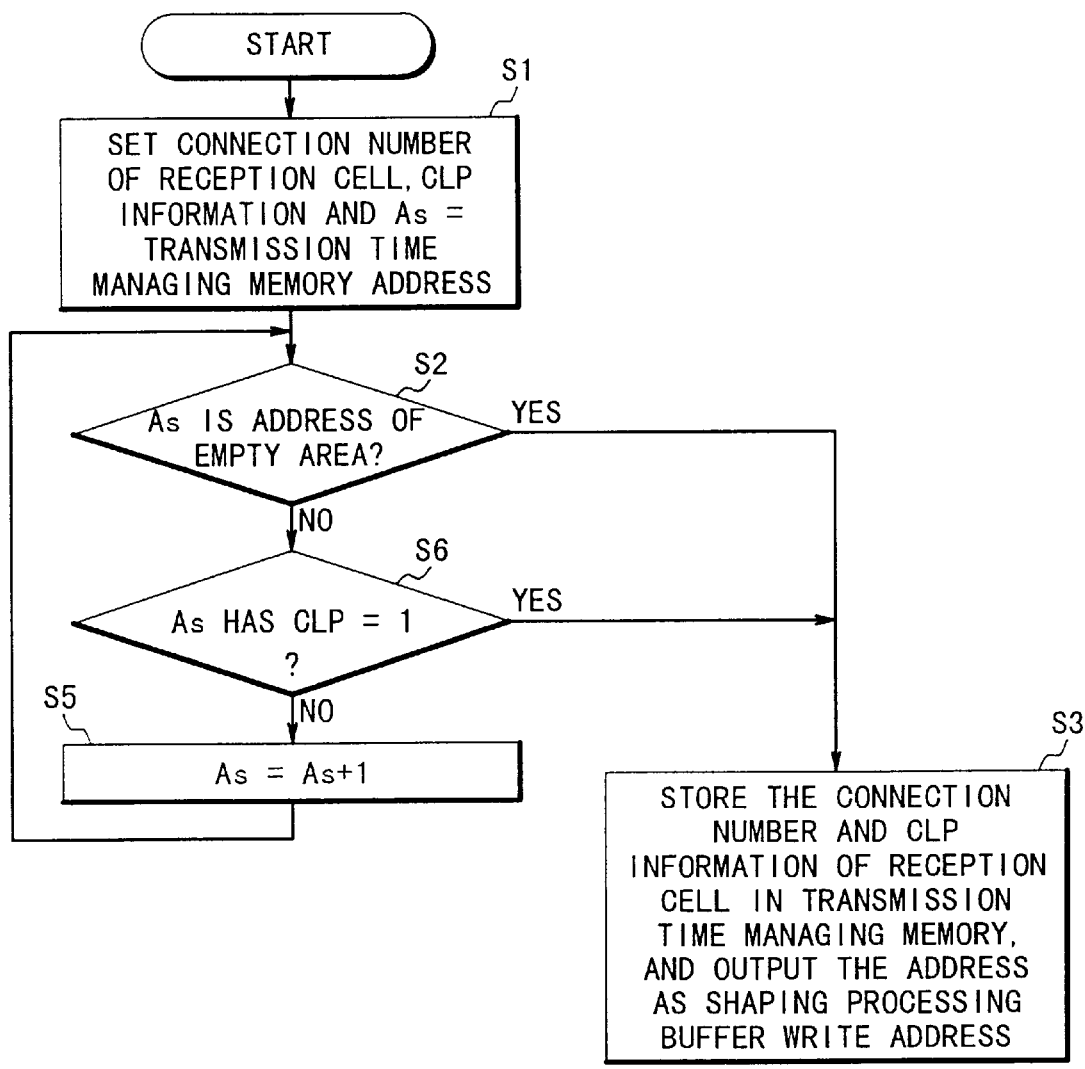
FIG. 10 is a flow chart illustrating the operation of the shaping processing apparatus according to a second embodiment of the present invention.
Figure 13:
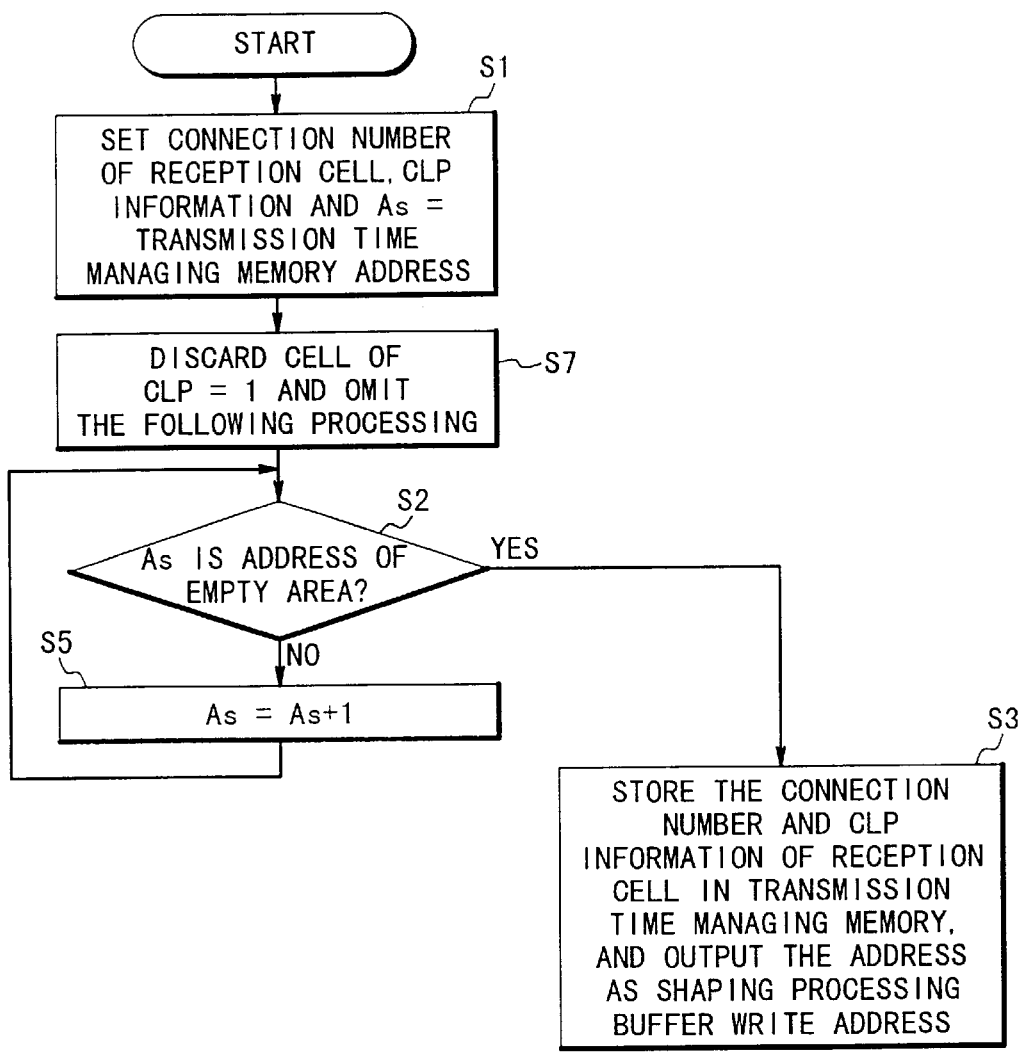
FIG. 13 is a flow chart illustrating the operation of the shaping processing apparatus according to a third embodiment of the present invention.
Figure 16:
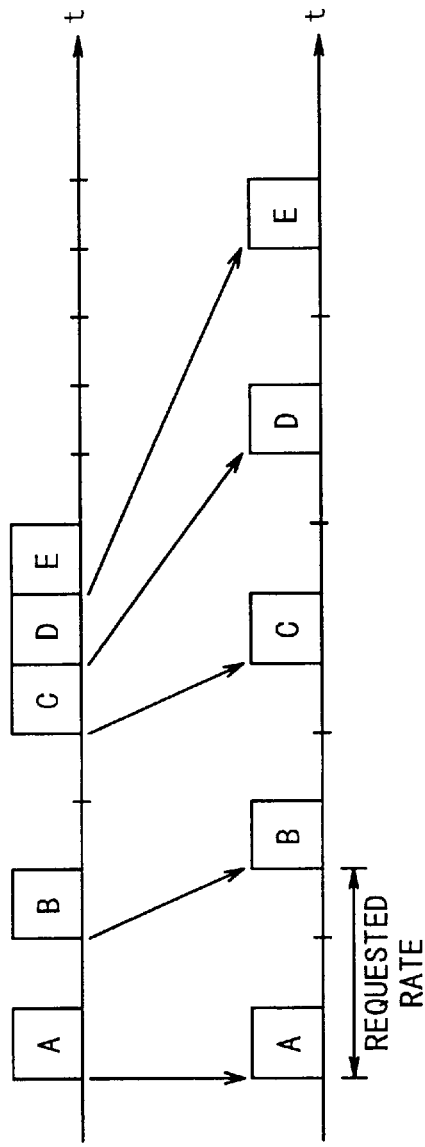
FIGS. 16A and 16B are diagrams illustrating the shaping operation.
Figure 17:
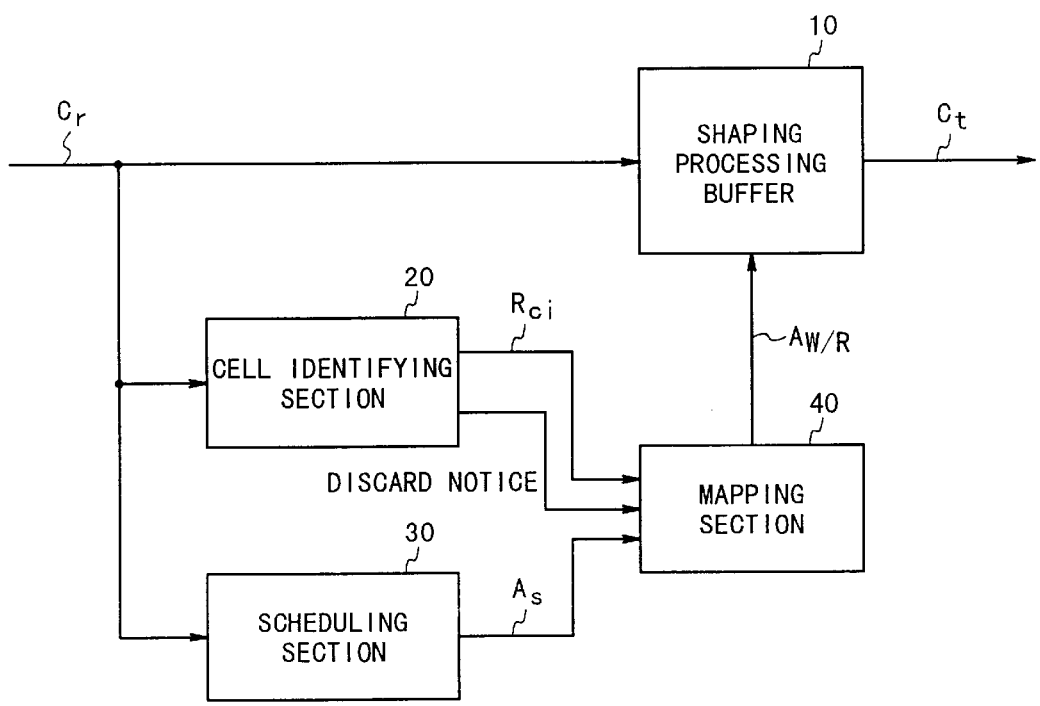
FIG. 17 is a block diagram illustrating the structure of the shaping processing apparatus according to the third embodiment of the present invention.

Next, the shaping processing apparatus according to the second embodiment of the present invention will be described with reference to FIGS. 10 to 12. The shaping processing apparatus in the second embodiment has the same structure as the first embodiment other than the point in which the step S4 in FIG. 6 is removed. That is, as shown in FIGS. 11 and 12, the overwrite is permitted in a case where the conflicting ATM cell has the same connection number as that of the reception ATM cell, in addition to the case where the conflicting ATM cell has the different connection number from that of the reception ATM cell. In this case, the same effect as in the first embodiment can be achieved.

Next, the shaping processing apparatus according to the third embodiment of the present invention will be described with reference to FIGS. 13 to 15 and 17. The shaping processing apparatus in the third embodiment has substantially the same structure as in the first embodiment except that the cell identifying section 20 issues a discard notice to the mapping section 40 when it is determined from the CLP bit that the reception ATM cell is a tagging cell, and the mapping section 40 stops the mapping of the reception ATM cell in response to the discard notice. That is, the steps S4 and S6 are removed from the flow chart shown in FIG. 6 and a step S7 is inserted between the step S1 and the step S2. In the third embodiment, when the reception ATM cell is a tagging ATM cell, the mapping section 40 does not perform the mapping and discards the reception ATM cell unconditionally (step S7). In this case, the same effect as the first embodiment mentioned above is also achieved.

As described above, according to the present invention, even if a tagging ATM cell has been stored in the shaping processing buffer, because the overwrite is permitted based on the condition which is primarily determined based on the reception ATM cell having arrived later, the following effect can be achieved.

Even if the ATM cell stream which has a relatively high burst traffic characteristic is received because a lot of tagging ATM cells are present in the same band, the discard quality of the reception ATM cell can be accomplished without overflow of the shaping processing buffer.

Also, in the case of design of the capacity of the shaping processing buffer, the network administrator can design the capacity of a buffer based on only the traffic characteristic of the normal ATM cells which are generated in the network. Even when the reception ATM cell is a tagging option, the change of the buffer capacity and so on is not made necessary.

Further, it is sufficient that the shaping processing buffer has the buffer capacity determined based on only the traffic characteristic of the normal ATM cells. Even when a tagging option is contained, the hardware forming a buffer memory can be made small, because the increase of the buffer quantity is not made necessary.

What is claimed is:

1. A shaping processing apparatus which receives ATM cells as reception ATM cells which contains normal ATM cells and tagging ATM cells, comprising:

a shaping processing buffer for writing a reception ATM cell in accordance with a write address, and for reading the written reception ATM cell in response to a read address as a transmission cell;

a scheduling unit for calculating a transmission time of said reception ATM cell based on a transmission time of a previous ATM cell belonging to a same connection as said reception ATM cell and transmitted immediately before said reception ATM cell and a predetermined time interval;

a cell identifying unit for identifying a connection number and cell priority of said reception ATM cell, with an ATM cell having a higher cell priority than a tagging ATM cell; and a mapping unit for mapping said reception ATM cell into a managing table based on said transmission time of said reception ATM cell to store said connection number and cell priority of said reception ATM cell in a storage area of said managing table, said managing table being associated with transmission times, for outputting a storage area address corresponding to said storage area as said write address to said shaping processing buffer, and for generating read addresses based on said managing table to output to said shaping processing buffer.

2. A shaping processing apparatus according to claim 1, wherein said mapping unit searches said managing table for said storage area address to which said mapping is possible.

3. A shaping processing apparatus according to claim 2, wherein said mapping unit determines that it is possible to map said reception ATM cell into said storage area address of said managing table when it is determined that said storage address of said managing table is empty.

4. A shaping processing apparatus according to claim 2, wherein said mapping unit determines that it is possible to map said reception ATM cell into said storage address of said managing table when it is determined that another ATM cell is already mapped into said storage area address of said managing table and when it is determined from a connection number and cell priority of said another ATM cell that said another ATM cell stored in said storage address is a tagging ATM cell having a same connection number as that of said reception ATM cell.

5. A shaping processing apparatus according to claim 2, wherein said mapping unit determines that it is possible to map said reception ATM cell into said storage area address of said managing table when it is determined that another ATM cell is already mapped into said storage area address of said managing table and when it is determined from a cell priority of said another ATM cell that said another ATM cell stored in said storage area address is a tagging ATM cell.

6. A shaping processing apparatus according to claim 1, wherein said cell identifying issues a discard notice to said mapping unit when determining from the cell priority of said reception ATM cell that said reception ATM cell is a tagging ATM cell, and wherein said mapping unit stops said mapping of said reception ATM cell in response to the discard notice.

7. A method of performing shaping processing, comprising the steps of:

(a) receiving an ATM cell as a reception ATM cell;

(b) extracting a connection number and a cell priority from said reception ATM cell;

(c) determining a transmission time of said reception ATM cell based on a transmission time of an ATM cell having a same connection number and transmitted immediately before said reception ATM cell, a predetermined time interval, and an arrival time of said reception ATM;

(d) generating a storage address of a transmission time managing memory for said reception ATM cell as a current address;

(e) referring to said transmission time managing memory to store said extracted connection number and extracted cell priority of said reception ATM cell in said current address of said transmission time managing memory, when said current address is empty;

(f) outputting said current address as a write address; and (g) storing said reception ATM cell in a shaping processing buffer.

8. A method according to claim 7, wherein said referring step (e) includes:
   (h) performing first determination of whether said current address is empty.

9. A method according to claim 8, wherein said step of performing first determination includes:
   (i) when it is determined that said current address is not empty, performing second determination of whether said cell priority stored in said current address is lower than said reception ATM cell; and
   (j) overwriting said extracted connection number and extracted cell priority of said reception ATM cell in said current address of said transmission time managing memory, when it is determined that said cell priority stored in said current address is lower than said reception ATM cell.

10. A method according to claim 9, further comprising the steps of:
   (k) when it is determined that said cell priority stored in said storage area address is not lower than said reception ATM cell, setting a storage area address of said transmission time managing memory subsequent to said current address in transmission time to a new current address; and
   (l) executing said steps (h) through (k) based on the new current address until said extracted connection number and extracted cell priority of said reception ATM cell are overwritten or stored in said current address of said transmission time managing memory.

11. A method according to claim 8, wherein said step of performing first determination includes:
   (m) when it is determined that said current address is not empty, performing second determination of whether said cell priority stored in said current address is lower than said reception ATM cell and whether said connection number stored in said current address is same as that of said reception ATM cell;
   (n) overwriting said extracted connection number and extracted cell priority of said reception ATM cell in said current address of said transmission time managing memory, when it is determined that said cell priority stored in said current address is lower than said reception ATM cell and that said connection number stored in said current address is same as that of said reception ATM cell.

12. A method according to claim 11, further comprising the steps of:
   (o) when it is determined that said cell priority stored in said storage address is not lower than said reception ATM cell, or that said connection number stored in said current address is not same as that of said reception ATM cell, setting a storage area address of said transmission time managing memory subsequent to said current address in transmission time to a new current address; and
   (p) executing said steps (h) and (m) through (o) based on the new current address until said extracted connection number and extracted cell priority of said reception ATM cell are overwritten or stored in said current address of said transmission time managing memory.

13. A method according to claim 7, further comprising the steps of:
   determining whether said cell priority of said reception ATM cell is lower than a predetermined value; and
   discarding said reception ATM cell when it is determined that said cell priority of said reception ATM cell is lower than the predetermined value.

14. A shaping processing apparatus, comprising:
   an extracting unit for receiving a reception ATM cell, and for extracting a connection number and a cell priority from said reception ATM cell;
   a scheduling unit for receiving said reception ATM cell, for determining a transmission time of said reception ATM cell based on a transmission time of an ATM cell having a same connection number which was transmitted immediately before said reception ATM cell, a predetermined time interval, and an arrival time of said reception ATM, and for generating a storage address of a transmission time managing memory for said reception ATM cell as a current address;
   a shaping processing buffer for storing said reception ATM cell in accordance with a write address; and
   a mapping unit including said transmission time managing memory, for referring to said transmission time managing memory to store said extracted connection number and extracted cell priority of said reception ATM cell in said current address of said transmission time managing memory, when said current address is empty, and for outputting said current address as said write address to said shaping processing buffer.

15. A shaping processing apparatus according to claim 14, wherein said mapping unit performs first determination of whether said current address is empty.

16. A shaping processing apparatus according to claim 15, wherein said mapping unit further performs second determination of whether said cell priority stored in said current address is lower than said reception ATM cell, when it is determined that said current address is not empty, and overwrites said extracted connection number and extracted cell priority of said reception ATM cell in said current address of said transmission time managing memory, when it is determined that said cell priority stored in said current address is lower than said reception ATM cell.

17. A shaping processing apparatus according to claim 16, wherein said mapping unit sets a storage area of said transmission time managing memory subsequent to said current address in transmission time to a new current address, when it is determined that said cell priority stored in said storage area address is not lower than said reception ATM cell, and executes said first and second determinations, said overwrite and said setting based on the new current address until said extracted connection number and extracted cell priority of said reception ATM cell are overwritten or stored in said current address of said transmission time managing memory.

18. A shaping processing apparatus according to claim 15, wherein mapping unit further performs second determination of whether said cell priority stored in said current address is lower than said reception ATM cell and whether said connection number stored in said current address is same as that of said reception ATM cell, when it is determined that said current address is not empty, and overwrites said extracted connection number and extracted cell priority of said reception ATM cell in said current address of said transmission time managing memory, when it is determined that said cell priority stored in said current address is lower than said reception ATM cell and that said connection number stored in said current address is same as that of said reception ATM cell.

19. A shaping processing apparatus according to claim 18, wherein said mapping unit further sets a storage area address of said transmission time managing memory subsequent to said current address in transmission time to a new current address, when it is determined that said cell priority stored in said storage area address is not lower than said reception ATM cell, or that said connection number stored in said current address is not same as that of said reception ATM cell, and executes said first and second determinations, said overwrite and said setting based on the new current address until said extracted connection number and extracted cell priority of said reception ATM cell are overwritten or stored in said current address of said transmission time managing memory.

20. A shaping processing apparatus according to claim 14, wherein said extracting unit further determines whether said cell priority of said reception ATM cell is lower than a predetermined value, and instructs said mapping unit to discard said reception ATM cell when it is determined that said cell priority of said reception ATM cell is lower than the predetermined value.

\* \* \* \* \*